US012684123B2

(12) United States Patent
Sen et al.

(10) Patent No.: US 12,684,123 B2
(45) Date of Patent: Jul. 14, 2026

(54) METHOD AND SYSTEM FOR ENERGY-EFFICIENT APPROXIMATE DIGITAL JPEG AND MJPEG-COMPRESSION

(71) Applicant: Quasistatics Inc., West Lafayette, IN (US)

(72) Inventors: Shreyas Sen, West Lafayette, IN (US); Archisman Ghosh, West Lafayette, IN (US)

(73) Assignee: Quasistatics Inc., West Lafayette, IN (US)

( * ) Notice: Subject to any disclaimer, the term of this patent is extended or adjusted under 35 U.S.C. 154(b) by 37 days.

(21) Appl. No.: 18/641,469

(22) Filed: Apr. 22, 2024

(65) Prior Publication Data

US 2025/0350725 A1 Nov. 13, 2025

Related U.S. Application Data

(60) Provisional application No. 63/461,279, filed on Apr. 23, 2023.

(51) Int. Cl.
| | |
|---|---|
| *H04N 19/00* | (2014.01) |
| *H04N 19/124* | (2014.01) |
| *H04N 19/176* | (2014.01) |
| *H04N 19/625* | (2014.01) |
| *H04N 19/93* | (2014.01) |

(52) U.S. Cl.
CPC ......... *H04N 19/124* (2014.11); *H04N 19/176* (2014.11); *H04N 19/625* (2014.11); *H04N 19/93* (2014.11)

(58) Field of Classification Search
CPC .. H04N 19/124; H04N 19/176; H04N 19/625; H04N 19/93
See application file for complete search history.

(56) References Cited

U.S. PATENT DOCUMENTS

| | | | |
|---|---|---|---|
| 11,122,290 B2 * | 9/2021 | Jang | H04N 19/503 |
| 2011/0261878 A1 | 10/2011 | Lu et al. | |
| 2018/0332289 A1 * | 11/2018 | Huang | H04N 19/96 |
| 2019/0349587 A1 * | 11/2019 | Jang | H04N 19/463 |

(Continued)

OTHER PUBLICATIONS

U.S. Appl. No. 09/324,095, filed Jun. 1999, Mustek Systems Inc.

*Primary Examiner* — Frank F Huang
(74) *Attorney, Agent, or Firm* — Kevin J Fournier IP Legal Services Ltd; Kevin J Fournier

(57) ABSTRACT

A system and method for energy-efficient approximate digital JPEG and MJPEG-compression. The system includes a controller unit to control a processing loop for processing image blocks based on a comparison of a current image block to a previous image block. The system includes a quantization unit configured to quantize the frequency domain representation using an approximate quantization process and a quantization (Q) matrix. The quantization unit is configured to: identify, a nearest power of two value for each element of the quantization matrix; generate an updated Q matrix by assigning each element of the quantization matrix with the identified nearest power of two value; and shift each element of the updated Q matrix by a number of bits to generate a quantized frequency domain representation. The number of bits corresponds to the identified nearest power of two for the corresponding element of the updated Q matrix.

20 Claims, 9 Drawing Sheets

(56) References Cited

U.S. PATENT DOCUMENTS

| | | | | | |
|---|---|---|---|---|---|
| 2019/0387241 A1* | 12/2019 | Kim | ..................... | H04N 19/625 | |
| 2020/0068195 A1* | 2/2020 | Yoo | ..................... | H04N 19/117 | |
| 2020/0145680 A1 | 5/2020 | Dikshit et al. | | | |
| 2020/0177901 A1* | 6/2020 | Choi | ................... | H04N 19/176 | |
| 2020/0177921 A1* | 6/2020 | Koo | ..................... | H04N 19/61 | |
| 2020/0374531 A1* | 11/2020 | Zhao | ................... | H04N 19/119 | |
| 2021/0014534 A1* | 1/2021 | Koo | ...................... | H04N 19/18 | |
| 2021/0084304 A1* | 3/2021 | Schwarz | ............. | H04N 19/176 | |
| 2021/0136385 A1* | 5/2021 | Schwarz | ................ | H04N 19/18 | |
| 2021/0144376 A1* | 5/2021 | Tsukuba | .............. | H04N 19/139 | |
| 2021/0211673 A1* | 7/2021 | Schwarz | ........... | H04N 19/1887 | |
| 2021/0211729 A1* | 7/2021 | Koo | ...................... | H04N 19/18 | |
| 2021/0218996 A1* | 7/2021 | Koo | ...................... | H04N 19/176 | |
| 2022/0094932 A1* | 3/2022 | De Lagrange | ....... | H04N 19/124 | |
| 2022/0191492 A1* | 6/2022 | Xu | ...................... | H04N 19/122 | |
| 2022/0303542 A1* | 9/2022 | Paluri | ................... | H04N 19/46 | |
| 2023/0084787 A1* | 3/2023 | De Lagrange | ....... | H04N 19/124 | |
| | | | | 375/240.03 | |
| 2023/0096533 A1* | 3/2023 | De Lagrange | ......... | H04N 19/86 | |
| | | | | 375/240.03 | |
| 2023/0232003 A1* | 7/2023 | De Lagrange | ....... | H04N 19/463 | |
| | | | | 375/240.03 | |
| 2023/0232045 A1* | 7/2023 | De Lagrange | ......... | H04N 19/85 | |
| | | | | 375/240.03 | |
| 2023/0262268 A1* | 8/2023 | De Lagrange | ....... | H04N 19/463 | |
| | | | | 375/240.26 | |
| 2023/0396770 A1* | 12/2023 | Zhang | ................... | H04N 19/96 | |

* cited by examiner

200a

CAMERA SETUP 202

Image voltage

Object 201

Objective imaging lens 203

Relay imaging lens 205

DMD 207

JPEG COMPRESSION SYSTEM 204

Analog image voltage

ADC 208

Digital Bits

DIGITAL JPEG COMPRESSION BLOCK 206

Compressed image Bits

QUANTIZATION BLOCK 212

MSB LOCATOR
UNIT 218

SHIFT
OPERATOR
UNIT 220

FIG. 2C

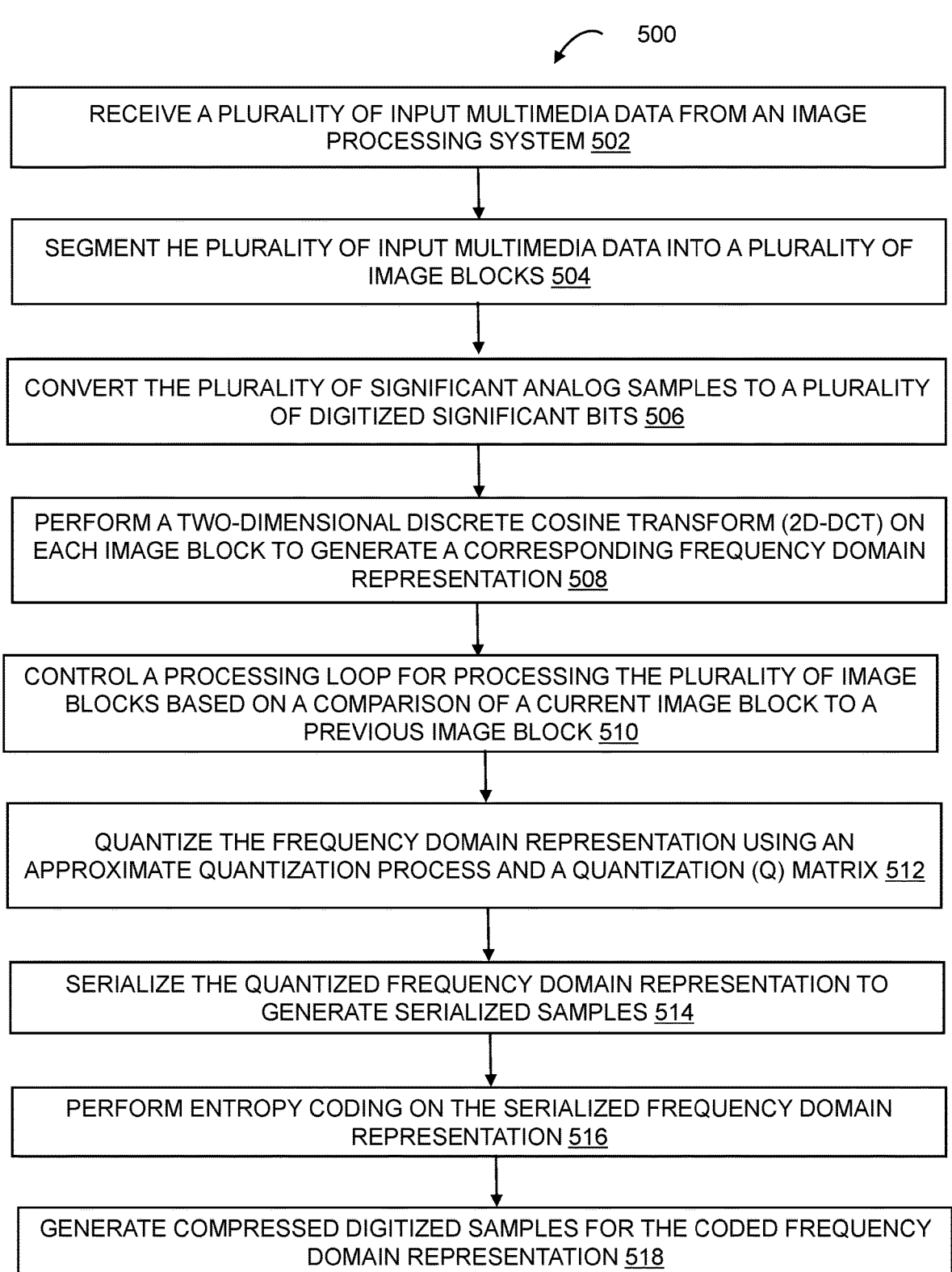

500

RECEIVE A PLURALITY OF INPUT MULTIMEDIA DATA FROM AN IMAGE PROCESSING SYSTEM 502

SEGMENT HE PLURALITY OF INPUT MULTIMEDIA DATA INTO A PLURALITY OF IMAGE BLOCKS 504

CONVERT THE PLURALITY OF SIGNIFICANT ANALOG SAMPLES TO A PLURALITY OF DIGITIZED SIGNIFICANT BITS 506

PERFORM A TWO-DIMENSIONAL DISCRETE COSINE TRANSFORM (2D-DCT) ON EACH IMAGE BLOCK TO GENERATE A CORRESPONDING FREQUENCY DOMAIN REPRESENTATION 508

CONTROL A PROCESSING LOOP FOR PROCESSING THE PLURALITY OF IMAGE BLOCKS BASED ON A COMPARISON OF A CURRENT IMAGE BLOCK TO A PREVIOUS IMAGE BLOCK 510

QUANTIZE THE FREQUENCY DOMAIN REPRESENTATION USING AN APPROXIMATE QUANTIZATION PROCESS AND A QUANTIZATION (Q) MATRIX 512

SERIALIZE THE QUANTIZED FREQUENCY DOMAIN REPRESENTATION TO GENERATE SERIALIZED SAMPLES 514

PERFORM ENTROPY CODING ON THE SERIALIZED FREQUENCY DOMAIN REPRESENTATION 516

GENERATE COMPRESSED DIGITIZED SAMPLES FOR THE CODED FREQUENCY DOMAIN REPRESENTATION 518

IDENTIFY A NEAREST POWER OF TWO VALUE FOR EACH ELEMENT OF THE QUANTIZATION MATRIX 602

GENERATE AN UPDATED Q MATRIX BY ASSIGNING EACH ELEMENT OF THE QUANTIZATION MATRIX WITH THE IDENTIFIED NEAREST POWER OF TWO VALUE 604

SHIFT EACH ELEMENT OF THE UPDATED Q MATRIX BY A NUMBER OF BITS TO GENERATE A QUANTIZED FREQUENCY DOMAIN REPRESENTATION 606

METHOD AND SYSTEM FOR ENERGY-EFFICIENT APPROXIMATE DIGITAL JPEG AND MJPEG-COMPRESSION

TECHNICAL FIELD

Embodiments of the present disclosure generally relate to data compression systems, and more particularly relates to a system and method for energy-efficient approximate digital JPEG and MJPEG compression.

BACKGROUND

Traditional JPEG compression is a powerful technique for image data compression. However, this requires significant processing of computation power. On example of a traditional JPEG compression system includes imaging sensor nodes. Power consumption is a major challenge in such imaging sensor nodes due to limited battery life. These nodes are often used in applications such as for example, wireless sensor networks and require energy-efficient methods for image capture and transmission. The current challenge lies in balancing image quality with energy consumption during JPEG compression on these resource-constrained devices.

Imaging sensor nodes, commonly used in wireless sensor networks and other resource-constrained applications, require efficient image capture and transmission. JPEG (Joint Photographic Experts Group) compression offers a powerful method for compressing image data, but traditional JPEG encoders are computationally expensive and consume excessive power. This high-power consumption significantly limits the battery life and operability of these sensor nodes.

Existing JPEG compression circuits rely on standard digital architectures that prioritize accuracy over efficiency. These architectures utilize complex operations like division in the quantization stage, leading to high power consumption. While effective for high-performance applications, they are unsuitable for resource-constrained sensor nodes. Such existing circuits consume high power due to complex processing, hindering the widespread adoption of JPEG compression in battery-powered sensor nodes.

Some approaches utilize hardware accelerators specifically designed for JPEG compression. While offering some improvement in power efficiency compared to standard architectures, these accelerators often have limited flexibility and cannot be easily adapted to varying application requirements. Such approaches have limited flexibility in adjusting the trade-off between energy consumption and image quality. Additionally, hardware accelerators may be costly and require additional space on the sensor node.

FIG. 1 illustrates an exemplary block diagram representation of a traditional JPEG compression architecture 100, according to prior art. The traditional JPEG compression architecture 100 comprises an input image 101, an JPEG compression system 102, and a compressed image 103. The JPEG compression system 102 further comprises a discrete cosine transform 104, a quantization block 106 and a Huffman encoding block 107. The constituent steps in the JPEG compression system 102 are as follows. The first step involves splitting the entire image into smaller windows of 8*8 pixels for processing. The next step involves performing 2D DCT operation to transform the image into a cosine domain, producing a sparse representation. Specifically, this mathematical operation transforms the image data from the spatial domain (representing pixel intensities) into the frequency domain (representing the distribution of image frequencies). Further, the next step involves quantizing the resulting image using Quantization (Q) matrix, which is an element-by-element division of image matrix with Q matrix, and finally, the next step involves serializing the image matrix in a zigzag fashion and perform run-length encoding to reduce the number of bits to be stored. The 2D DCT is implemented using 8 1-D DCTs. 2-D DCT is the first step towards JPEG compression. The division operation in the Q block is normally achieved by a standard integer division. Finally, a zigzag traversal, namely Huffman Encoding, is implemented as the last step as shown in FIG. 1.

Such traditional JPEG compression systems comprise quantization which involves element-by-element division of DCT coefficients by a pre-defined quantization matrix (Q-matrix). This division operation is computationally expensive and consumes significant power.

Therefore, there is a need in the art to provide a system and method for an energy-efficient JPEG compression method specifically designed for resource-constrained imaging sensor nodes to address the aforementioned deficiencies in the art.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

An aspect of the present disclosure provides a system for energy-efficient approximate digital jpeg and mjpeg-compression. The system includes a two-dimensional Discrete Cosine Transform (2D DCT) circuit configured to receive a plurality of input multimedia data from an image processing system. The 2D DCT circuit is further configured to segment the plurality of input multimedia data into a plurality of image blocks; and perform a two-dimensional discrete cosine transform (2D-DCT) on each image block to generate a corresponding frequency domain representation. The system further includes a controller unit configured to control a processing loop for processing the plurality of image blocks based on a comparison of a current image block to a previous image block. The processing of the current image block is skipped when the current image block satisfies a predetermined similarity criteria with respect to the previous image block. The system further includes a quantization unit configured to quantize the frequency domain representation using an approximate quantization process and a quantization (Q) matrix. In the approximate quantization process, the quantization unit is configured to: identify, a nearest power of two value for each element of the quantization matrix; generate an updated Q matrix by assigning each element of the quantization matrix with the identified nearest power of two value; and shift each element of the updated Q matrix by a number of bits to generate a quantized frequency domain representation. The number of bits corresponds to the identified nearest power of two for the corresponding element of the updated Q matrix. The system further includes a zigzag traversing unit configured to serialize the quantized frequency domain representation to generate serialized samples. The system further includes a run length encoder unit configured to perform entropy coding on the serialized frequency domain representation; and generate compressed digitized samples for the coded frequency domain representation.

Another aspect of the present disclosure includes a method for energy-efficient approximate digital JPEG and MJPEG-compression samples. The method includes receiving a plurality of input multimedia data from an image processing system. Further, the method includes segmenting the plurality of input multimedia data into a plurality of image blocks. Further, the method includes performing a two-dimensional discrete cosine transform (2D-DCT) on each image block to generate a corresponding frequency domain representation. Further, the method includes controlling a processing loop for processing the plurality of image blocks based on a comparison of a current image block to a previous image block. The processing of the current image block is skipped when the current image block satisfies a predetermined similarity criteria with respect to the previous image block. Further, the method includes quantizing the frequency domain representation using an approximate quantization process and a quantization (Q) matrix. The approximate quantization process comprising identifying a nearest power of two value for each element of the quantization matrix; generating an updated Q matrix by assigning each element of the quantization matrix with the identified nearest power of two value; and shifting each element of the updated Q matrix by a number of bits to generate a quantized frequency domain representation. The number of bits corresponds to the identified nearest power of two for the corresponding element of the updated Q matrix. Further, the method includes serializing the quantized frequency domain representation to generate serialized samples. Furthermore, the method includes performing entropy coding on the serialized frequency domain representation; and generating compressed digitized samples for the coded frequency domain representation.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF ACCOMPANYING DRAWINGS

The disclosure will be described and explained with additional specificity and detail with the accompanying figures in which.

Figure 1:
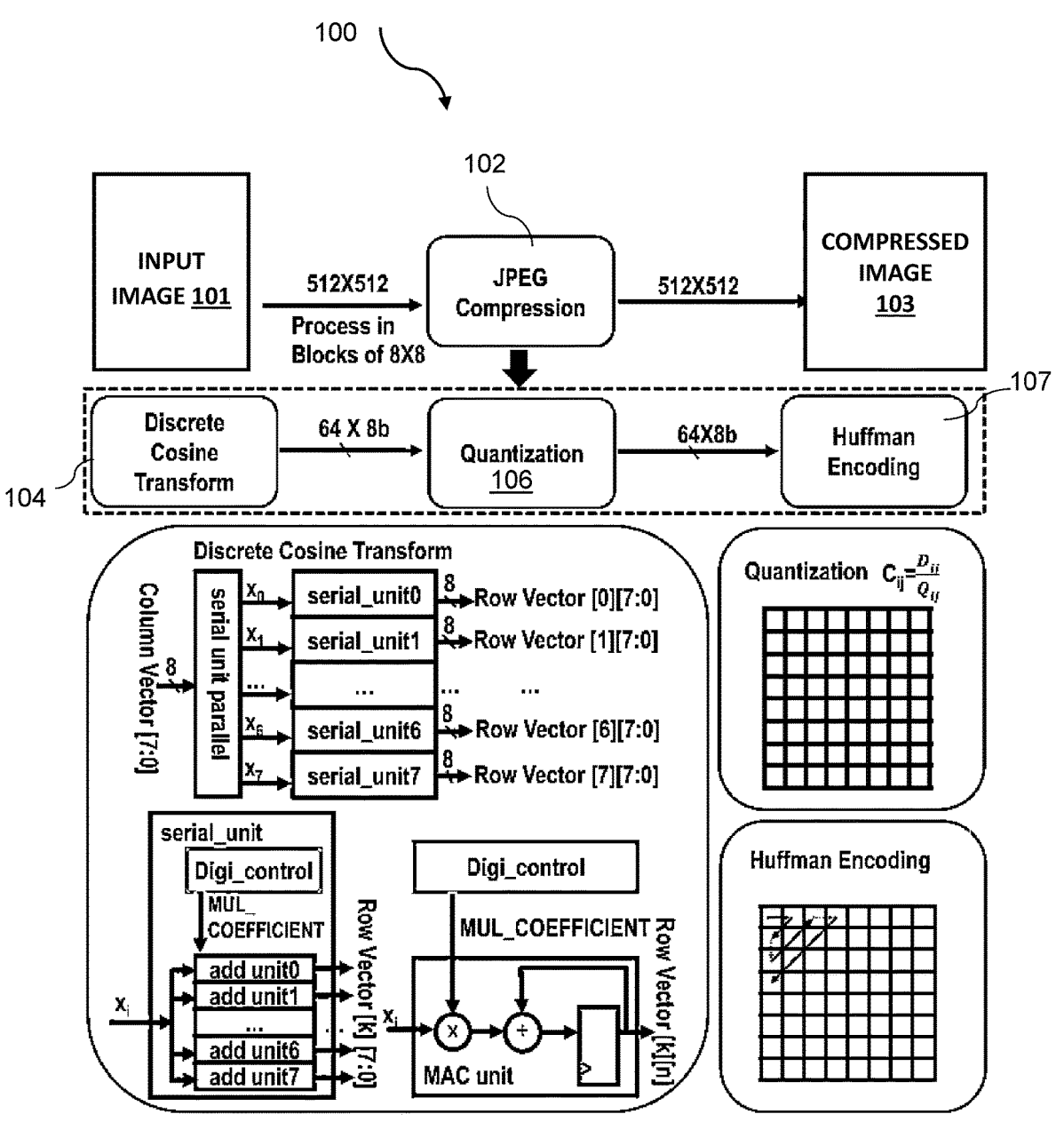
FIG. 1 illustrates an exemplary block diagram representation of a traditional JPEG compression architecture, according to prior art.
Figure 2A:
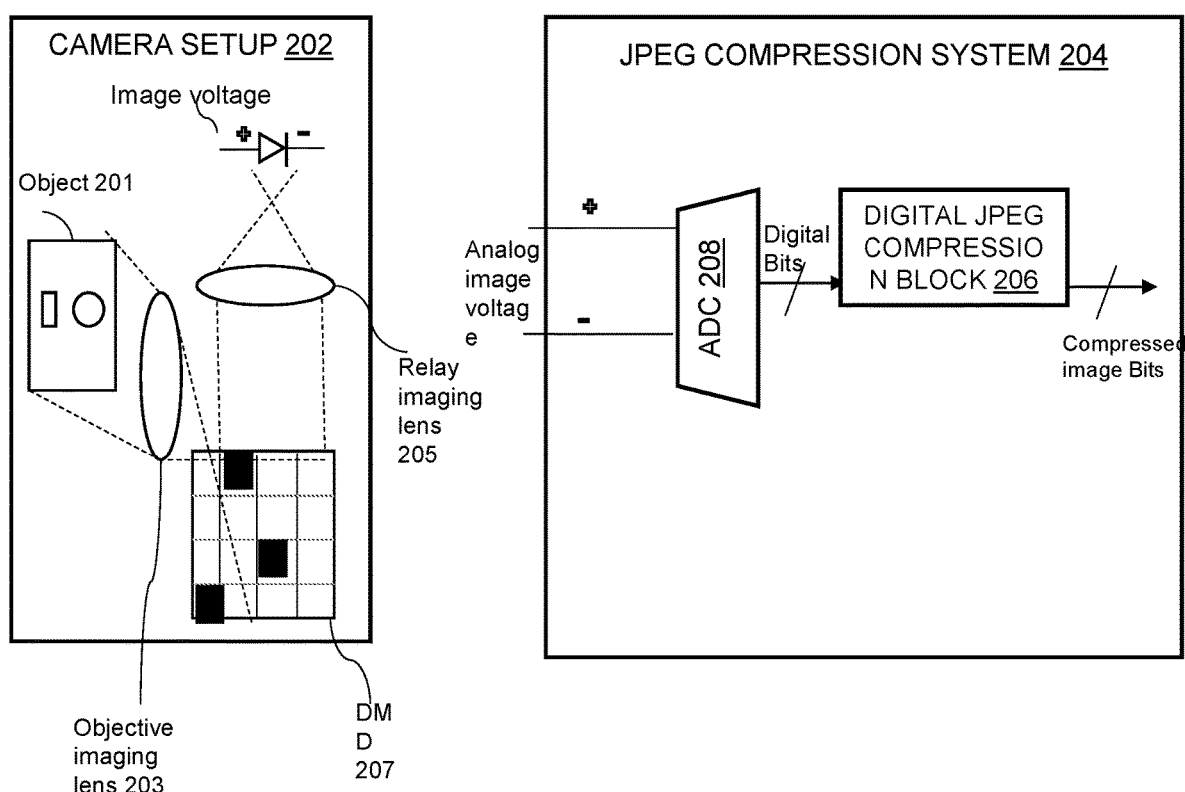
FIG. 2A illustrates an exemplary block diagram representation of a network architecture for JPEG compression, according to an example embodiment of the present disclosure.
Figure 2B:
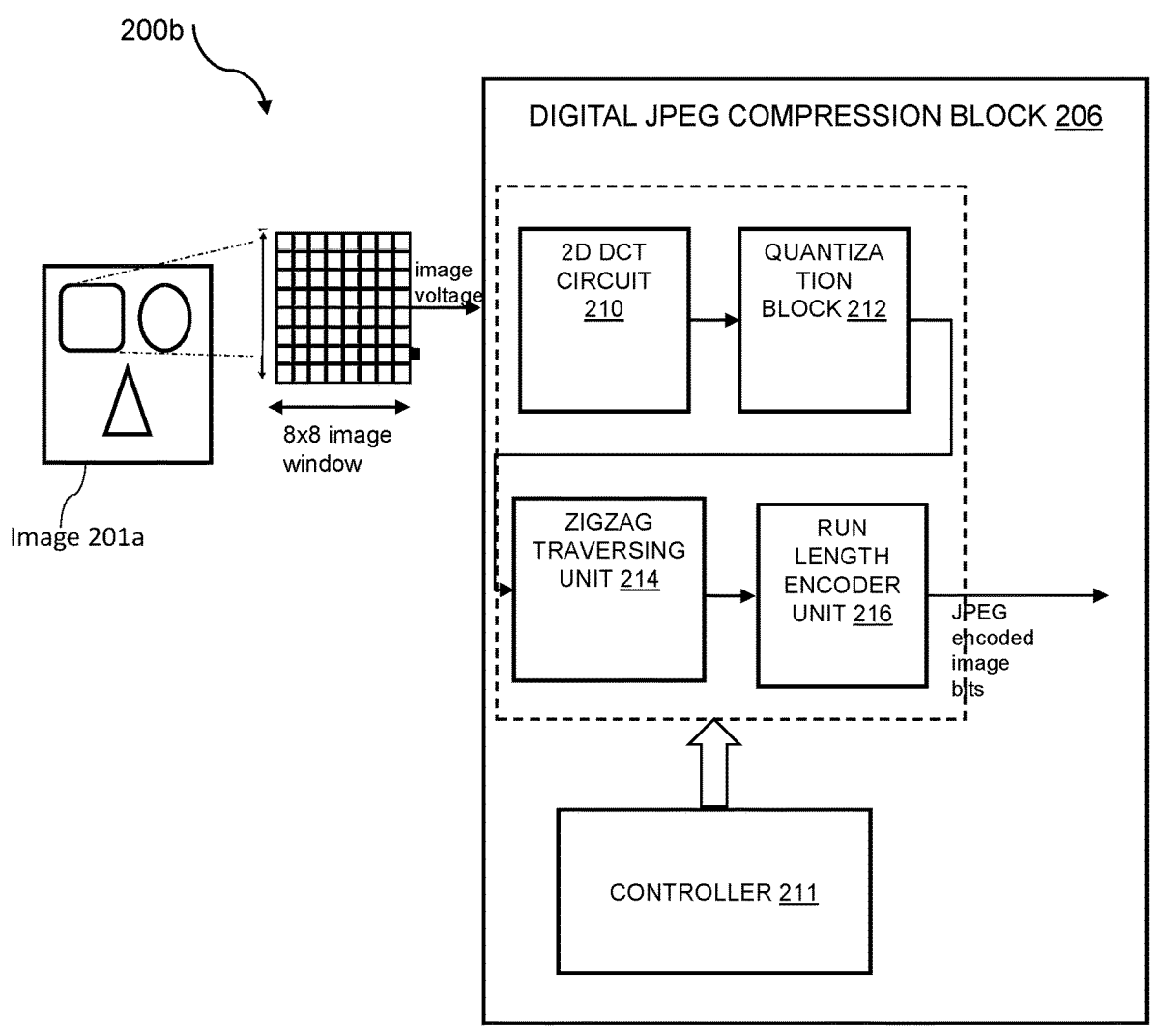
Figure 2C:
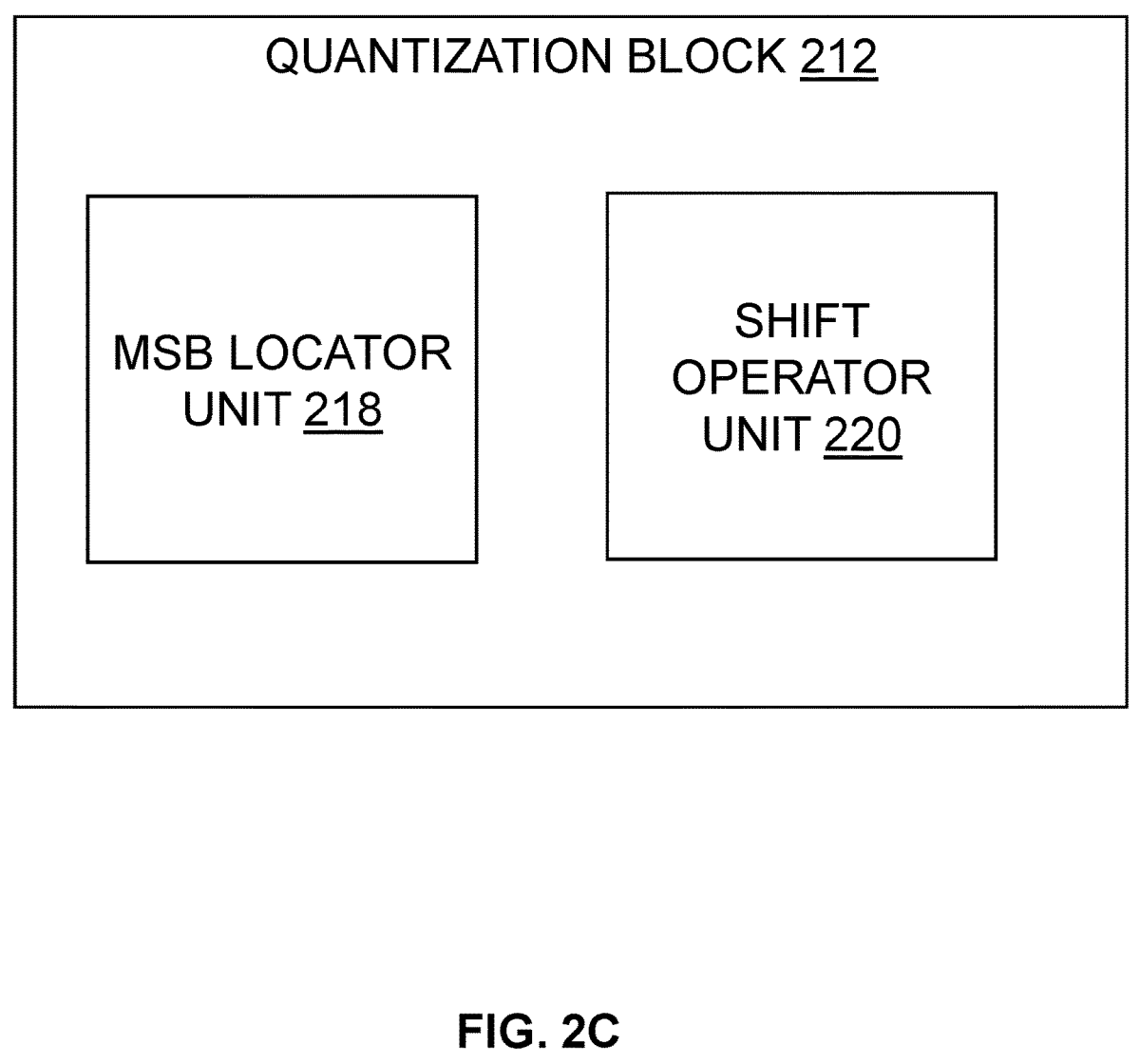
Figure 2D:
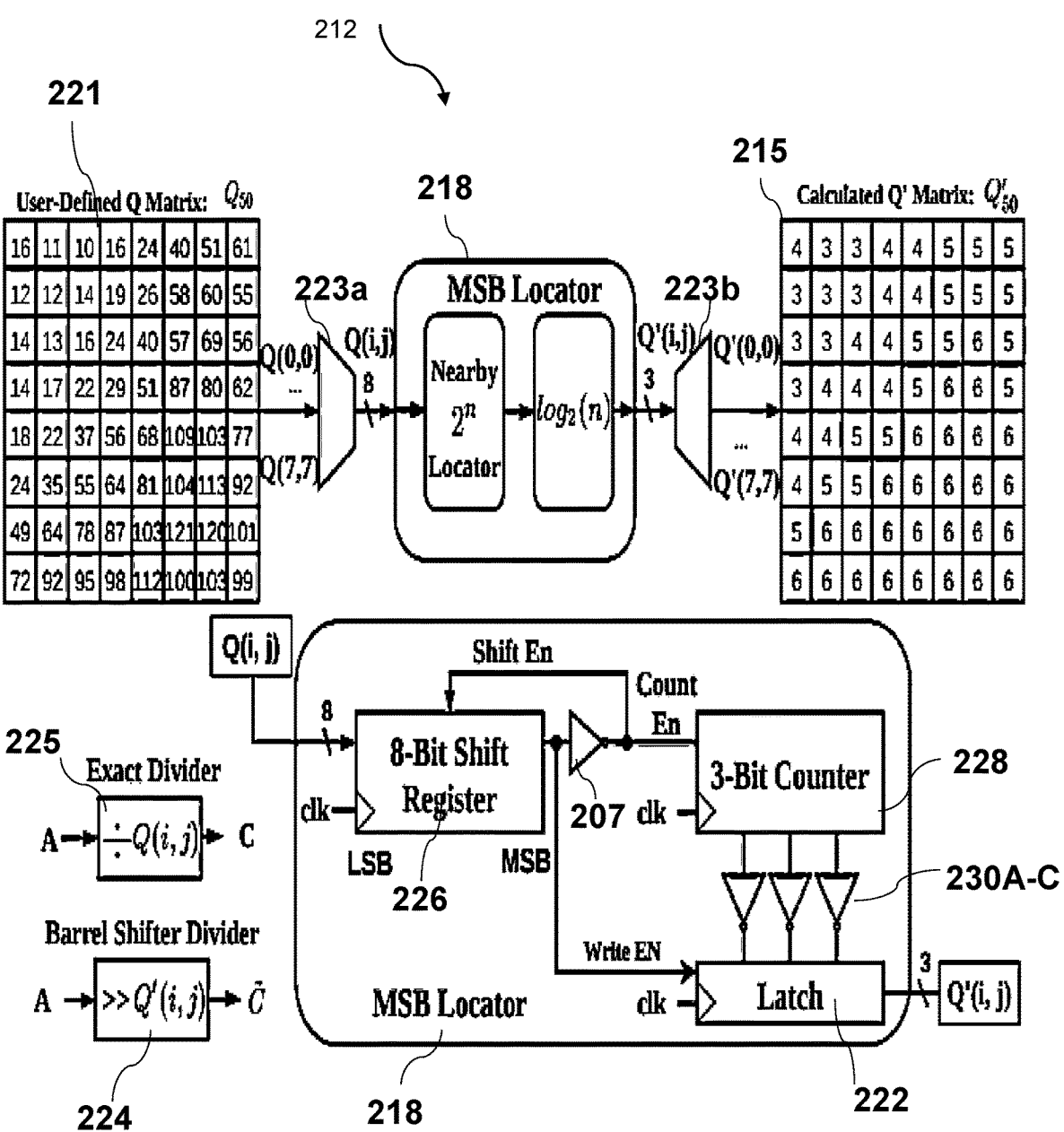
Figures 3A, 3B:
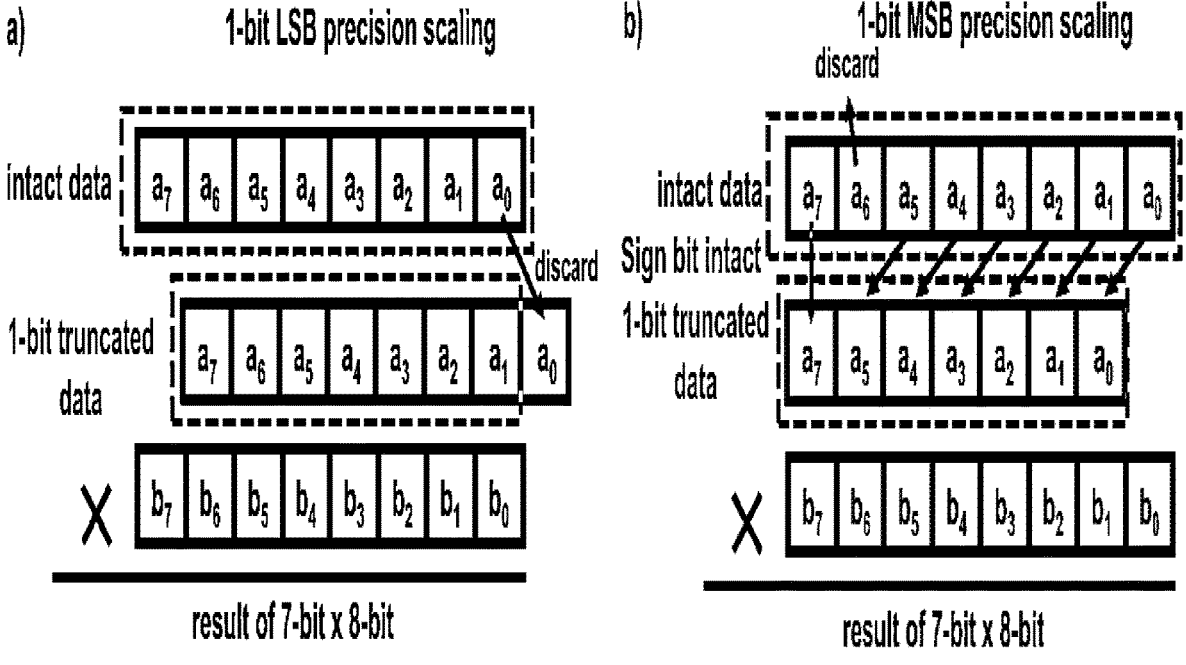
Figure 4:
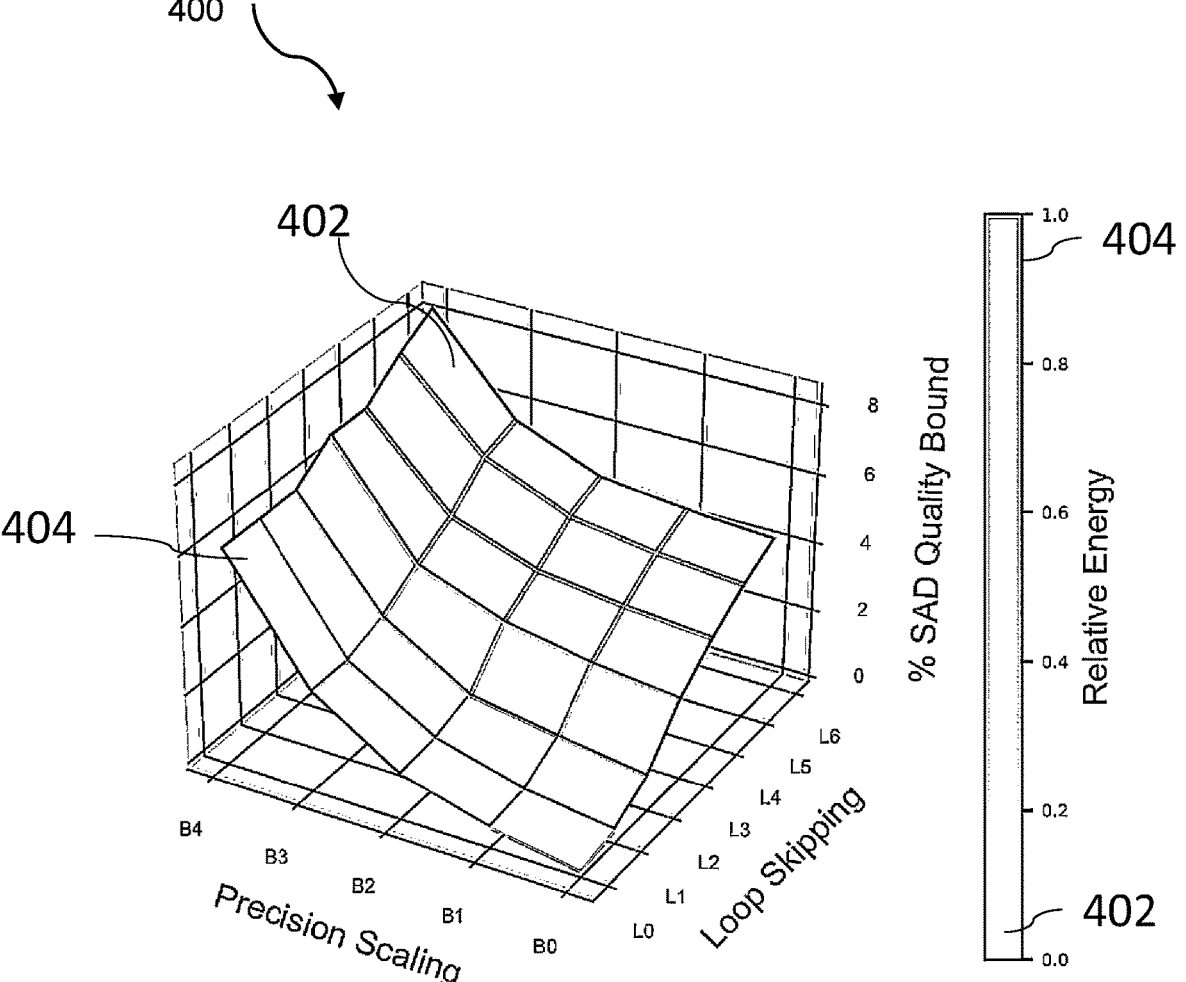
Figure 6:
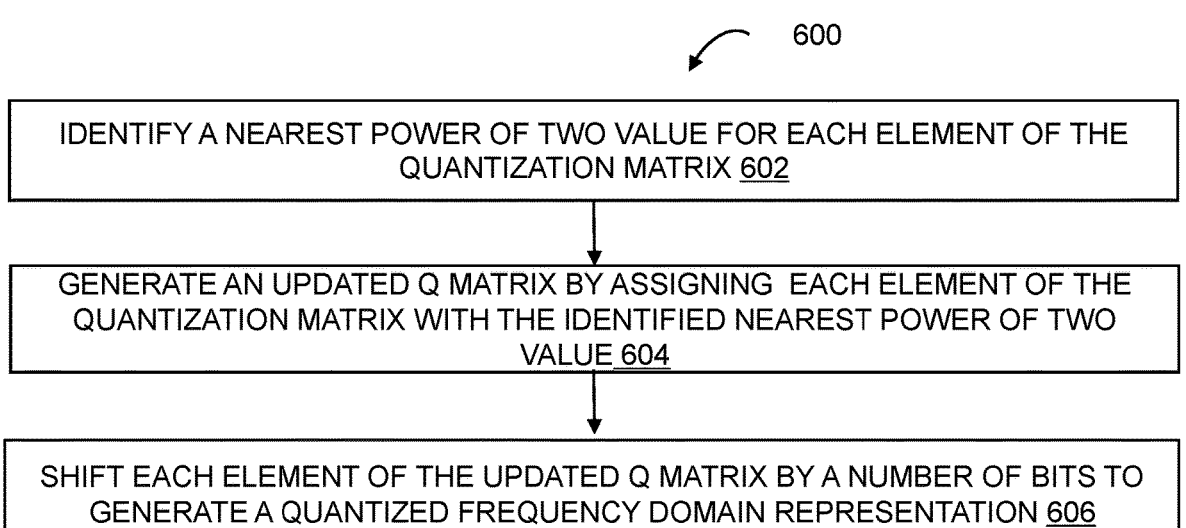

FIG. 2B exemplary block diagram representation of the digital JPEG compression block, such as those shown in FIG. 2A, depicting a complete flow of events for converting direct analog samples to compressed digitized samples. according to an example embodiment of the present disclosure;

FIG. 2C illustrates an exemplary block diagram representation of a quantization block capable of quantizing a frequency domain representation using an approximate quantization process and a quantization (Q) matrix, according to an example embodiment of the present disclosure;

FIG. 2D illustrates an exemplary circuit diagram representation of a quantization block, such as those shown in FIG. 2C, for quantizing a frequency domain representation using an approximate quantization process and a quantization (Q) matrix, according to an example embodiment of the present disclosure;

FIGS. 3A-B illustrates a data byte representation of a Q-element depicting an exemplary process of precision scaling, according to an example embodiment of the present disclosure;

FIG. 4 illustrates a graphical representation of a three-dimensional (3D) Q-E plot for different loop perforation and precision scaling knobs, along with relative energy required for processing, according to an example embodiment of the present disclosure;

FIG. 5 illustrates an exemplary flow chart representation of a method for compressing multimedia data into digital samples, according to an example embodiment of the present disclosure; and FIG. 6 illustrates an exemplary flow chart representation of a method for quantizing a frequency domain representation using an approximate quantization process and a quantization (Q) matrix, according to an example embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration". Any embodiment or implementation of the present subject matter described herein as "exemplary" is not necessarily to be construed as preferred or advantageous over other embodiments. The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment", "in an exemplary embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting. A computer system (standalone, client, or server, or computer-implemented system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or a "subsystem" may also comprise programmable logic or circuitry (as encompassed within a general-purpose processor or other programmable processor) that is temporarily configured by software to perform certain operations. Accordingly, the term "module" or "subsystem" should be understood to encompass a tangible entity, be that an entity that is physically constructed permanently configured (hardwired), or temporarily configured (programmed) to operate in a certain manner and/or to perform certain operations described herein.

Embodiments of the present disclosure describe an end-to-end approximation methodology for converting pixel data to JPEG encoded information bits dedicatedly for digital energy-constraint image sensors. The present system demonstrates a first end-to-end approximate computing-based optimization of JPEG hardware using i) an approximate division realized using bit-shift operators to reduce the complexity of the computationally intensive quantization block ii) loop perforation and iii) precision scaling. Furthermore, a gradient descent-based heuristic composed of two conventional approximation strategies, i.e., Precision Scaling, and Loop Perforation is implemented for tuning the degree of approximation to trade-off energy consumption with the quality degradation of the decoded image. The present method facilitates a significant reduction in the required energy over the other state-of-the-art JPEG digital accelerators and may be further extended to other algorithms, applications, and sensor nodes, such as for example, but not limited to, video, biosensor nodes that currently accomplish processing in digital domain.

Referring now to the drawings, and more particularly to FIG. 2 through FIG. 6, where similar reference characters denote corresponding features consistently throughout the figures, there are shown preferred embodiments, and these embodiments are described in the context of the following exemplary system and/or method.

FIG. 2A illustrates an exemplary block diagram representation of a network architecture 200a for JPEG compression, according to an example embodiment of the present disclosure. Such network architecture 200a may employ imaging sensor nodes. The network architecture 200a includes a camera setup 202 and a JPEG compression system 204. The JPEG compression system 204 comprises an analog to digital converter (ADC) 208 and a digital JPEG compression block 206. The ADC 208 may be consistently engaged in compression process, contributing to overall power requirements of the JPEG compression systems 204. The camera setup 202 may include an object 201, an objective imaging lens 203, a digital micromirror device (DMD) 207 and a relay imaging lens 205. The camera setup 202 is configured to generate analog image voltages from the capture image of the object 201. Some examples of the real time image may be derived from a video captured by the camera setup 202 or may be a direct picture captured by the camera setup 202. Alternatively, the camera setup may be replaced by any other image capturing means such as, but not limited to, a camera. As used in this disclosure, a "camera" may be a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. In an alternate embodiment, the image processing unit 202 may be, for example, but not limited to, a digital camera, a surveillance camera, a smart phone, a mobile phone, a personal computer, or any other device, which may have an imaging functionality.

The objective imaging lens 203 is positioned to receive light information from the object 201 and focuses it onto a designated image plane. The object 201 may be any scene or an environment or any other setup. The objective imaging lens 203 may utilize advanced optical technologies to ensure precise imaging, producing a detailed representation of the object 201 for subsequent processing.

The relay imaging lens 205 may be configured to enhance analog image voltage generation process. The design of the relay imaging lens 205 may be optimized to transmit the captured image from the objective imaging lens 203 to the digital micromirror device (DMD) 207 in a manner that preserves fidelity of image data. The relay imaging lens 205 achieves this by employing optical principles, minimizing distortions and aberrations during the image transfer process.

The digital micromirror device (DMD) 207 may be configured for converting the digital image data into analog media voltages, such as, for example, analog image voltages. The DMD 207 may utilize an array of micro mirrors to modulate light intensity, creating a corresponding analog voltage that accurately represents the captured image. This transformation from digital to analog is crucial for applications requiring precise voltage representation, such as analog signal processing or interfacing with analog components. The generated analog media voltages are transmitted to the system 204 in the form of a plurality of input analog samples.

The JPEG compression system 204 includes the ADC 208 and the digital JPEG compression block 206. A detailed explanation of the digital JPEG compression block 206 is described in FIG. 2B-D. The digital JPEG compression block 206 is capable of providing energy-efficient JPEG/MJPEG compression for scenarios involving imaging sensor nodes that usually demand a constrained power budget. The digital JPEG compression block 206 can be approximated without much loss in quality due to its error-resilience nature to fit in area-constraint and energy-constraint budget unlike standard digital architectures. The digital JPEG compression block 206 comprises an updated quantization block (as shown in FIG. 2C), capable of performing the steps described below in order to achieve energy-efficient JPEG/MJPEG compression.

In an exemplary embodiment, the system 204 may be a JPEG compressor, such as, but not limited to, smartphone image processing units integrated into the system-on-chip (SoC) of smartphones, digital camera compression modules, embedded systems for surveillance and the like. In an example embodiment, the term "JPEG compressor" or "the system 204" may refer to both software algorithms and hardware components or accelerators that may assist in compression process.

FIG. 2B exemplary block diagram representation of the digital JPEG compression block 206, such as those shown in FIG. 2A, depicting a complete flow of events for converting direct analog samples to compressed digitized samples. In an embodiment, at first, an image 201a is divided into smaller windows of 8×8 pixels for processing. This step is crucial for managing and processing image data in smaller and more manageable chunks. Each 8×8 pixel or image windows are converted into analog image voltages and are fed to a two-dimensional Discrete Cosine Transform (2D DCT) circuit 210 of the system 206 (also referred herein as digital JPEG compression block 206). The result is a transformation of the image into a cosine domain, producing a sparse representation. The 2D DCT circuit 210 is further configured to transform the received plurality of input analog samples into a 2D-DCT sample using a DCT matrix.

The 2D DCT circuit 210 is configured to receive a plurality of input multimedia data from an image processing system. Further, the 2D DCT circuit 210 is configured to segment the plurality of input multimedia data into a plurality of image blocks. Further, the 2D DCT circuit 210 is configured to perform a two-dimensional discrete cosine transform (2D-DCT) on each image block to generate a corresponding frequency domain representation.

Upon completing the 2D DCT operation, the resulting image is quantized using a Quantization (Q) matrix at a quantization unit 212 (also referred herein as quantization block 212). The quantization unit 212 is configured to perform quantization on the 2D-DCT samples to generate quantized samples using the quantization (Q) matrix.

In a preferred embodiment, the quantization unit 212 is configured to quantize the frequency domain representation using an approximate quantization process and a quantization (Q) matrix. In the approximate quantization process, the quantization unit 212 is configured to identify, a nearest power of two value for each element of the quantization matrix; generate an updated Q matrix by assigning each element of the quantization matrix with the identified nearest power of two value; and shift each element of the updated Q matrix by a number of bits to generate a quantized frequency domain representation. The number of bits corresponds to the identified nearest power of two for the corresponding element of the updated Q matrix.

The quantization unit 212 is further configured to perform bit truncation of one of less significant bits and most significant bits of the frequency domain representation, wherein the bit truncation is performed by modifying a bit width throughout a JPEG accelerator data path.

The zigzag traversing unit 214 is configured to serialize the quantized frequency domain representation to generate serialized samples. Additionally, a run-length encoding technique is applied to reduce the number of bits required to store the JPEG-encoded data using a run length encoder unit 216. This step is crucial for optimizing the storage efficiency of the compressed image. The run length encoder unit 216 is configured to perform run-length encoding on the generated serialized samples using a counter. Specifically, the run length encoder unit 216 is configured to perform entropy coding on the serialized frequency domain representation; and generate compressed digitized samples for the coded frequency domain representation. The output of the digital compression block 206 is the JPEG encoded image bits.

The controller 211 may be configured to control a processing loop for processing the plurality of image blocks based on a comparison of a current image block to a previous image block. The processing loop may include, for example, a series of steps within the system 206 that process each image block. The processing of the current image block is skipped when the current image block satisfies a predetermined similarity criteria with respect to the previous image block. The predetermined similarity criteria comprises a set of conditions defined by the system 206 to determine if two image blocks are similar enough to skip processing the current block. This leverages spatial redundancy in images. The controlling of the processing loop comprises clock gating and power gating the quantization unit for processing the image blocks when the processing loop is skipped. The processing loop is controlled using one or more tunable operating knobs to control a degree of bit truncation and a degree of loop skipping based on the user's quality requirements. The processing of the image blocks based on a comparison of the current image block to a previous image block includes, such as for example, but not limited to, one of compression, information generation, and inference and the like.

The controller unit 211 is further configured to generate a quality-energy (Q-E) plot for different degrees of approximation in the approximate quantization process and the controlling of the processing loop; and obtain optimal operating knobs for an input image and a desired image quality bound received from the user by using heuristics, wherein the heuristics comprises at least one of a gradient descent, a mean squared error, and a convex optimization solving method. The gradient descent-based optimization search is applied to identify an optimal configuration of the operating knobs for the input image required for the approximate quantization process and the controlling the processing loop based on the desired image quality bound. The heuristics comprises quality metrics to evaluate performance of the heuristics and tune the operating knobs, wherein the quality metric comprises one of a percentage Sum of Absolute Differences (% SAD), a Structural Similarity Index (SSIM), and a Peak Signal to Noise Ratio (PSNR). In identifying an optimal configuration of the operating knobs for the input image required for the approximate quantization process and the controlling the processing loop based on the desired image quality bound, the controller unit 211 is configured to: vary a plurality of loop perforation categories and bit truncation levels to obtain an optimal configuration for a particular output quality bound; and automatically configure a degree of loop perforation and the bit truncation, respectively, by tuning in direction of steepest gradient of ratio of energy savings to quality degradation resulting from the variation in each degree of the approximation knobs.

Furthermore, the controller unit 211 is further configured to: obtain the generated Q-E plots representing insights into degradation of quality of decoded images; and determine an operating knob configuration along with relative energy saving value for N images corresponding to a specific output image quality bound.

In certain embodiments, the controller unit 211 may use data driven models such as artificial intelligence and machine learning models to implement the above steps.

Though few components and subsystems are disclosed in FIGS. 2A and 2B, there may be additional components and subsystems which is not shown, such as, but not limited to, ports, routers, repeaters, firewall devices, network devices, databases, network attached storage devices, user devices, additional processing systems, servers, assets, machineries, instruments, facility equipment, any other devices, and combination thereof. The person skilled in the art should not be limiting the components/subsystems shown in FIG. 2A-B. Although FIG. 2A-B illustrates the system 204, is connected to the camera setup 202, one skilled in the art may envision that the system 204, may be connected to several camera setup 202, located at same/different locations.

Those of ordinary skilled in the art will appreciate that the hardware depicted in FIG. 2A may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the system 204 as is unique to the present disclosure or necessary for an understanding of the present disclosure is depicted and described. The remainder of the construction and operation of the system 204 may conform to any of the various current implementations and practices that were known in the art.

FIG. 2C illustrates an exemplary block diagram representation of a quantization block 212 capable of quantizing a frequency domain representation using an approximate quantization process and a quantization (Q) matrix, according to an example embodiment of the present disclosure. In an exemplary embodiment, the quantization block 212 comprises a most significant bit (MSB) locator 218 and a shift operator 204. The MSB locator 218 is configured to identify the nearest power of two value for each element of the quantization matrix. Further, the MSB locator 218 is configured to generate an updated Q matrix by assigning each element of the quantization matrix with the identified nearest power of two value. In identifying the nearest power of two values for each element of the quantization matrix, the MSB locator 218 is configured to determine a location of a first occurrence of a most significant bit (MSB) from a most significant side. The MSB is determined for each Q value in Q matrix. In determining the location of the first occurrence of the MSB, the MSB locator 218 is configured to store each Q value in the Q matrix in a non shift register, shift each binary value corresponding to each Q value by one bit until first occurrence of the MSB is determined; and identify the location of the MSB determined based on number of bits shifted.

Further, the MSB locator 218 is configured to determine the number of bits to be shifted based on the determined location of the MSB. The determined number of bits corresponds to the identified nearest power of two for the corresponding element of the quantization matrix. In the context of the JPEG compression with approximate quantization explained earlier, bit shifting is used to replace the typical division operation during the quantization step. Normally, the quantization process involves dividing each element of the frequency domain coefficient by a corresponding element in a quantization matrix. This division reduces the precision of the coefficients. In the proposed method, the original quantization matrix is replaced with a new matrix where each element is approximated to the nearest power of 2. To perform quantization on a coefficient, instead of dividing it by the corresponding element in the approximated matrix, the coefficient is shifted to the right by a specific number of bits. The number of bits to shift is determined by the position of the most significant 1 (MSB) in the approximated quantization element (power of 2). For example, if the approximated element is 8 (which is $2^3$), the MSB is at the third position from the left. Therefore, the coefficient would be shifted three bits to the right to achieve a similar reduction in precision as the original division.

Each element in the original Q-matrix 221 is analyzed to find the closest power of the two. This can be done using a circuit called an MSB (Most Significant Bit) locator 218. The MSB locator 218 takes each element from the original Q-matrix 221 as input. The MSB locator 218 performs a bit-shift operation on the element, essentially shifting the bits to the right one by one. The MSB locator 218 keeps track of the number of positions it has shifted until it encounters the first "1" bit. This position indicates the location of the MSB. Based on the MSB position identified, a new value is assigned to the corresponding element in the modified Q-matrix (Q') 205. This new value is a power of two that has the same MSB position as the original element.

For example, let us say an element in the original Q-matrix 221 is 12 (represented in binary as 1100). The MSB locator 218 would find the first "1" bit at the third position from the left. In the modified Q-matrix (Q') 215, the corresponding element is replaced with 8 (represented in binary as 1000), which is the nearest power of two with the MSB at the same position.

The shift operator 220 is configured to shift each element of the updated Q matrix by a number of bits to generate a quantized frequency domain representation The number of bits corresponds to the identified nearest power of two for the corresponding element of the updated Q matrix.

FIG. 2D illustrates an exemplary circuit diagram representation of a quantization block, such as those shown in FIG. 2C, for quantizing a frequency domain representation using an approximate quantization process and a quantization (Q) matrix, according to an example embodiment of the present disclosure. The quantization block 212 (also referred herein as an approximate quantization block) is provided as quantization is one of the most power-consuming blocks. The quantization block 212 is configured to replace an actual quantization matrix with a nearest floor of power of two. Such approximated quantization matrix does not reduce quality drastically. FIG. 2C depicts a circuit to search for nearest power of two by a most significant bit (MSB) locator 218. Each Q-value within the user-defined Q matrix 221 goes through a shift operation and the first occurrence of "1" within such Q-value is searched from a MSB side. A n-bit counter 228 (such as for example, a 3-bit counter) keeps on calculating a cycle required to determine a most significant bit "1". This cycle suggests how many bits to be shifted to perform the quantization in the approximate quantization paradigm.

Once the MSB is located and a redefined quantization matrix Q' 215 is obtained as per user's requirement of quality, a bit shift operation instead of division-based quantization is used. This leads to a significant amount of power and area reduction with respect to standard implementation.

FIGS. 3A-B illustrates a data byte representation of a Q-element depicting an exemplary process of precision scaling, according to an example embodiment of the present disclosure. FIGS. 3A-B depicts three techniques employed to achieve energy-efficient image compression: precision scaling, loop skipping, and their combination with approximate quantization. According to FIG. 3A, a precision scaling approach is depicted. The precision scaling involves discarding a user-defined number of least significant bits (LSBs) from a data during calculations (part a) of the figure). Truncating the LSBs introduces minimal quality degradation compared to truncating more significant bits (MSB truncation, part b) of the figure). This technique is applied throughout the processing pipeline of the JPEG compression systems. Additionally, the truncated bits can be disabled using power/clock gating to further reduce energy consumption when not actively used.

Further, a second approach loop skipping, also known as loop perforation, leverages the spatial redundancy present in natural images. By comparing a current block of pixels to the previous block, this approach can skip processing the current block if it is sufficiently similar to the previous one. This significantly reduces the amount of computation required, leading to substantial energy savings. Predefined conditions determine the level of similarity required to skip processing while maintaining acceptable image quality. Since the data for skipped pixels has already been processed, loop skipping offers significant energy savings through clock gating and power gating when the entire circuit responsible for processing is inactive (loop is skipped). To maximize the energy efficiency achieved through approximate computing, this method proposes combining loop skipping and precision scaling with the previously explained approximate quantization technique. This combined approach offers superior energy savings compared to using each technique independently.

Tables. 1 and Table. 2 depict a detailed process depicting how to configure the image compression algorithm to achieve the best balance between image quality and energy consumption. This is achieved using a technique called gradient descent optimization.

TABLE 1

| Algorithm 1: To extract the Q-E characteristics for individual approximation technique |
| --- |
| Input: Set of required image qualities: Q[0 : N − 1] |
| Output: Set of quality knob configuration: k[0 : N − 1] |
| and energy consumption: E[0 : N − 1] |
| corresponding to Q[0 : N − 1] |
| 1    for (i = 0; i < N; i = i + 1) do |
| 2      \|    m = 0; |

TABLE 1-continued

| Algorithm 1: To extract the Q-E characteristics for individual approximation technique |
| --- |
| 3    \|    while ((k[m]) ≥ Q[i]) do |
| 4    \|      \|_    m = m+1; |
| 5    \|_    E[i] = E[(k[m − 1])]; k[i] = k[m − 1]; |
| 6    return k, QE |

TABLE 2

| Algorithm 2: Gradient descent determines the optimal approximation degrees for a given quality bound |
| --- |
| Input: Output quality bound: $Q_A$, |
| Quality vs. Energy (Q-E) curves for loop perforation and precision scaling ($Q_l$-$E_l$) and ($Q_t$-$E_t$), respectively |
| Output: Approximation knob settings (i, j) and Energy configuration for loop perforation and bit truncation ($E_l$, $E_t$) corresponding to $Q_A$ |
| 1   Initialize: i = j = 0, Q = 1, $E_t$ = 1, $E_t$ = 1 |
| 2   while (Q ≥ $Q_A$) do |
| 3  \|     $E_{l\Delta}$ = $E_l$[i] − $E_l$[i + 1]; $Q_{l\Delta}$ = Q − $Q_l$[i + 1]; |
| 4  \|     $E_{t\Delta}$ = $E_t$[j] − $E_t$[j + 1]; $Q_{t\Delta}$ = Q − $Q_t$[j + 1]; |
| 5  \|     if $\left(\dfrac{Q_l\Delta}{E_l\Delta} \geq \dfrac{Q_t\Delta}{E_t\Delta}\right)$ then |
| 6  \|  \|    if ($Q_t$[j + 1] ≤ $Q_A$) then |
| 7  \|  \|  L   E = E − $E_{l\Delta}$; Q = Q − $Q_{t\Delta}$; j = j + 1; |
| 8  \|  \|    else if ($Q_i$[i + 1] ≤ QA) then |
| 9  \|  \|  L   E = E − $E_{l\Delta}$; Q = Q − $Q_{l\Delta}$; i = i + 1; |
|    \|  L |
| 10 \|    else |
| 11 \|  \|    if ($Q_l$[i + 1] ≤ $Q_A$) then |
| 12 \|  \|  L   E = E − $E_{l\Delta}$; Q = Q − $Q_{l\Delta}$; i = i + 1; |
| 13 \|  \|    else if ($Q_t$[j + 1] ≤ $Q_A$) then |
| 14 \|  \|  L   E = E − $E_{t\Delta}$; Q = Q − $Q_{t\Delta}$; j = j + 1; |
|   \|  L |
|    L |
| 15    return i, j, $E_l$, $E_t$; |

TABLE. 1 depicts a Quality-Energy (Q-E) Plots. In this approach, individual Q-E plots are generated. These plots show the trade-off between image quality and energy savings for different combinations of approximation settings. For example, an image quality degradation setting refers to how much the quality of the final image is reduced compared to the original image. Also, a relative energy savings setting indicates the amount of energy saved compared to using a standard, non-approximate compression method. To generate these plots, the algorithm processes a set of N images (N is a specific number) from standard image processing libraries. Each image is compressed using various combinations of loop perforation categories. The loop perforation categories refer to different levels of loop skipping, where higher levels skip more similar image blocks. Further, each image is compressed using bit truncation level. This refers to the number of least significant bits truncated during precision scaling (explained earlier). By plotting the resulting image quality degradation against the relative energy savings for each combination of settings, a Q-E plot is obtained. In an exemplary embodiment, Table. 1 below describe an example method for obtaining the individual Q-E plots that provide insights into the degradation of the quality of the decoded images for benefits in relative energy for different approximation scenarios. For a particular output image quality bound, the quality knobs, along with the relative energy savings are found for N images, taken from standard libraries of image processing forums.

TABLE. 2 depicts a Gradient Descent Optimization method. This method utilizes these Q-E plots to find the optimal configuration for a desired image quality target. Gradient descent is a search technique used to optimize functions. In this case, the function being optimized is the ratio of energy savings to quality degradation. The algorithm starts with an initial guess for the loop perforation category and bit truncation level. further, the algorithm then iteratively adjusts these settings based on the steepest descent of the Q-E plot. This means it moves towards the settings that result in the greatest improvement in the ratio of energy savings to quality degradation. This process continues until the algorithm reaches a stopping criterion, such as a maximum number of iterations or a sufficiently satisfactory solution. In an exemplary embodiment, the Table. 2 employs a gradient descent-based optimization search using these extracted plots to provide an overall Quality vs Energy for the combined strategy. Varying the different Loop perforation categories and bit truncation levels to obtain the optimum settings for a particular output quality bound. Gradient descent is a commonly used heuristic for optimizing convex functions with a finite convergence rate. The controller implementing this heuristic, realized in software (not limited to, can be implemented in hardware too), automatically configures the degree of loop perforation and bit truncation, respectively, by moving in the direction of the steepest gradient of the ratio of energy savings to quality degradation resulting from the variation in each degree of the approximation knobs.

In an exemplary embodiment, an automatic configuration and controller is disclosed. Such controller may reside within the JPEG compression system. The controller implementing this algorithm can be realized in software or hardware. Based on the final loop perforation category and bit truncation level determined by the gradient descent search, the controller may automatically configure the image compression algorithm to achieve the desired balance between image quality and energy consumption. In essence, this approach allows the system to automatically select the most energy-efficient configuration that meets a pre-defined target image quality level.

FIG. 4 illustrates a graphical representation of a three-dimensional (3D) Q-E plot for different loop perforation and precision scaling knobs, along with relative energy required for processing, according to an example embodiment of the present disclosure. FIG. 4 refers to a 3D Q-E (Quality-Energy) plot that incorporates the impact of both loop perforation categories and bit truncation levels on image compression. This plot helps to visualize a trade-off between image quality, energy consumption, and the configuration settings. One axis of the plot represents the different loop perforation categories (levels of skipping similar image blocks). Another axis represents the various bit truncation levels used in precision scaling (number of least significant bits discarded). The third axis represents the relative energy required for processing an image using a specific combination of loop perforation and bit truncation settings (lower values 402 indicate less energy consumption). The color bar on the right side of the plot signifies the level of image quality degradation. Warmer colors might correspond to higher degradation 404, while cooler colors 402 might represent lower degradation.

Given a desired maximum level of image quality degradation (specified quality degradation bound), the gradient descent algorithm (or any other suitable optimization algorithm) utilizes this 3D plot to identify the optimal configuration. The algorithm essentially searches for the point within the plot that has the lowest relative energy consumption (represented by the position on the z-axis) while staying below the specified quality degradation bound indicated by the color bar. In simpler terms, the 3D plot allows us to efficiently explore the settings and choose the combination of loop perforation and bit truncation that achieves the lowest energy consumption while meeting the pre-defined image quality requirement. This approach helps strike a balance between these two crucial factors during image compression.

FIG. 5 illustrates an exemplary flow chart representation of a method for compressing multimedia data into digital samples, according to an example embodiment of the present disclosure. At step 502, a plurality of input multimedia data from an image processing system is received. The image processing system may be, for example, a camera or any other image capturing means. The plurality of multimedia data may be plurality of images, or video or any other form of data. Ats step 504, the plurality of input multimedia data is segmented into a plurality of image blocks. At step 506, a two-dimensional discrete cosine transform (2D-DCT) is performed on each image block to generate a corresponding frequency domain representation. At step 508, a processing loop for processing the plurality of image blocks is controlled based on a comparison of a current image block to a previous image block. The processing of the current image block is skipped when the current image block satisfies a predetermined similarity criteria with respect to the previous image block. At step 510, the frequency domain representation is quantized using an approximate quantization process and a quantization (Q) matrix. The approximate quantization process is explained in FIG. 6. At step 512, the quantized frequency domain representation is serialized to generate serialized samples. At step 516, an entropy coding on the serialized frequency domain representation is performed. At step 518, compressed digitized samples for the coded frequency domain representation are generated.

FIG. 6 illustrates an exemplary flow chart representation of a method for quantizing a frequency domain representation using an approximate quantization process and a quantization (Q) matrix, according to an example embodiment of the present disclosure. At step 602, the nearest power of two values for each element of the quantization matrix is identified. At step 604, an updated Q matrix is generated by assigning each element of the quantization matrix with the identified nearest power of two value. At step 606, each element of the updated Q matrix is shifted by a number of bits to generate a quantized frequency domain representation. The number of bits corresponds to the identified nearest power of two for the corresponding element of the updated Q matrix.

The method 500 or 600 may be implemented in any suitable hardware, software, firmware, or combination thereof. The order in which the method 500 or 600 is described is not intended to be construed as a limitation, and any number of the described method blocks may be combined or otherwise performed in any order to implement the method 500 or 600 or an alternate method. Additionally, individual blocks may be deleted from the method 500 or 600 without departing from the spirit and scope of the present disclosure described herein. Furthermore, the method 500 or 600 may be implemented in any suitable hardware, software, firmware, or a combination thereof, that exists in the related art or that is later developed. The method 500 or 600 describes, without limitation, the implementation of the system 206. A person of skill in the art will understand that method 900 may be modified appropriately for implementation in various manners without departing from the scope and spirit of the disclosure.

In an embodiment, the system 206 may be connected to any external systems (not shown) for further processing of the JPEG digitized bits. In one example embodiment, the system 206 may also include a hardware processor(s) (not shown) which may be coupled to a memory (not shown in FIGS.). The memory may include a plurality of modules/subsystems. The system 206 may be a hardware device including the hardware processor executing machine-readable program instructions for converting the direct analog samples to compressed digitized samples. Execution of the machine-readable program instructions by the hardware processor may enable the system 206 to convert the direct analog samples to compressed digitized samples. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The hardware processor(s) may include, but are not limited to, microprocessors, microcomputers, microcontrollers, digital signal processors, central processing units, state machines, logic circuits, and/or any devices that manipulate data or signals based on operational instructions, and the like. Among other capabilities, the hardware processor may fetch and execute computer-readable instructions in the memory operationally coupled with the system 206 for performing tasks such as data processing, input/output processing, and/or any other functions. Any reference to a task in the present disclosure may refer to an operation being or that may be performed on data.

One of the ordinary skill in the art will appreciate that techniques consistent with the present disclosure are applicable in other contexts as well without departing from the scope of the disclosure.

Embodiments herein disclose a method and system for low-energy image processing targeted towards JPEG compression for energy-constraint image sensors is described, which utilizes i) an approximate division realized using bit-shift operators to reduce the complexity of the computationally intensive quantization block ii) loop perforation and iii) precision scaling for energy-savings. Moreover, a shift-based approximate quantization block significantly reduces the area with respect to standard quantization block. A gradient descent-based heuristic composed of two conventional approximation strategies, i.e., Precision Scaling, and Loop Perforation is implemented for tuning the degree of approximation to trade-off energy consumption with the quality degradation of the decoded image. This end-to-end approximate architecture for JPEG compression presents a low power alternative to the traditional digital architecture owing to error-resilience nature of JPEG compression technique.

The present disclosure discloses a method for compressing image and video data (JPEG/MJPEG) with lower power consumption and reduced hardware footprint (area). For example, the method utilizes an "end-to-end approximate JPEG compression accelerator." This hardware unit efficiently converts input image pixels into compressed JPEG-encoded data. The present system 206 employs a combination of techniques to achieve low power and area consumption. Firstly, an appropriate quantization is used. This refers to a method for reducing the precision of image data during compression. Secondly, precision Scaling/Bit Truncation is used. This may involve discarding a certain number of least significant bits from the data during processing, reducing the overall data size and computation complexity. Further, Loop Perforation/Loop Skipping may be used. This leverages the spatial redundancy in images. By comparing a current block of pixels to the previous block, the system 206 may skip processing the current block if it's sufficiently similar, saving energy. In the approximate process, a specific type of quantization may be designed for lower power consumption. Instead of using traditional division operations, the system 206 employs a pre-defined quantization matrix where each element is approximated to the nearest power of 2. Further, by converting elements to the nearest power of 2, the system 206 can perform quantization using bit-shifting operations, which are much simpler and more energy-efficient compared to division. A Pre-processing Unit or a MSB locator unit determines the location of the most significant bit (MSB) within each element of the original quantization matrix. This information is used to calculate the equivalent power of two for bit-shifting. In the precision scaling, the system 206 can adjust the bit width used throughout the processing pipeline to implement bit truncation. This allows for a trade-off between image quality and energy savings. Further, the precision scaling involves clock gating and power gating. In this case, non-essential bits (those truncated) can be disabled using clock gating and power gating techniques to minimize power consumption when not actively used. Further, in Loop Skipping, the system 206 skips processing redundant image data. For example, the controller unit 211 analyzes the current block of pixels and compares it to the previous block. If the current block is sufficiently similar to the previous one, the system 206 skips processing it entirely, reducing energy consumption. Furthermore, the user may control the level of loop skipping based on their desired balance between image quality and compression efficiency.

Furthermore, the system 206 may automatically configure itself for optimal performance. A heuristic (Optimization Algorithms) involving techniques such as, for example, but not limited to, gradient descent, mean squared error, or other optimization methods are used to find the best combination of bit truncation (reconfigurable bit width) and loop skipping levels for a given input image and desired image quality. Additionally, metrics, such as for example, but not limited to, sum of Absolute Differences (% SAD) may be used to evaluate trade-off between image quality and compression efficiency. These metrics help guide the optimization process. Further, the method can potentially omit processing high-frequency image components as they might contribute less to overall information and can be discarded for further power savings. This approach to approximate computing can be extended to other algorithms and applications beyond JPEG/MJPEG compression.

The concept of approximate computing using similar techniques can be applied to various areas, including, for example, but not limited to, machine learning accelerators, 1-D signal processing, image processing tasks such as for example, but not limited to, object detection or recognition, other image, and video compression formats (PNG, MJPEG, H.264) and the like. This technique can be beneficial for processing data in energy-constrained environments such as for example, but not limited to, biosensors and augmented/virtual reality (AR/VR) devices.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, a. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like, of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a", "an", and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limited, of the scope of the invention, which is outlined in the following claims.

What is claimed is:

1. A system for energy-efficient approximate digital JPEG and MJPEG-compression samples, the system comprising:
a two-dimensional Discrete Cosine Transform (2D DCT) circuit configured to:
receive a plurality of input multimedia data from an image processing system;
segment the plurality of input multimedia data into a plurality of image blocks; and
perform a two-dimensional discrete cosine transform (2D-DCT) on each image block to generate a corresponding frequency domain representation;
a controller unit configured to control a processing loop for processing the plurality of image blocks based on a comparison of a current image block to a previous image block, wherein processing of the current image block is skipped when the current image block satisfies a predetermined similarity criteria with respect to the previous image block;
a quantization unit configured to quantize the frequency domain representation using an approximate quantization process and a quantization (Q) matrix, wherein in the approximate quantization process, the quantization unit is configured to:
identify, a power of two value equal to $2^s$ for each element of the quantization matrix, where s is a position of a most significant '1' bit of the element;
generate an updated Q matrix by assigning each element of the quantization matrix with the identified power of two value; and
shift each element of the updated Q matrix by a number of bits to generate a quantized frequency domain representation, wherein the number of bits corresponds to the identified power of two for the corresponding element of the updated Q matrix;
a zigzag traversing unit configured to serialize the quantized frequency domain representation to generate serialized samples;
a run length encoder unit configured to:
perform entropy coding on the serialized frequency domain representation; and
generate compressed digitized samples for the coded frequency domain representation.

2. The system of claim 1, wherein in the approximate quantization process, the quantization unit is further configured to:
perform bit truncation of one of less significant bits and most significant bits of the frequency domain representation, wherein the bit truncation is performed by modifying a bit width throughout a JPEG accelerator data path.

3. The system of claim 1, wherein in controlling of the processing loop, the controller unit is configured to:
perform clock gating and power gating the quantization unit for processing the image blocks when the processing loop is skipped.

4. The system of claim 1, wherein controlling of the processing loop, the controller unit is configured to:

controlling of the processing loop using one or more tunable operating knobs to control a degree of bit truncation and a degree of loop skipping based on the user's quality requirements.

5. The system of claim 1, wherein the controller unit is configured to:

generate a quality-energy (Q-E) plot for different degrees of approximation in the approximate quantization process and the controlling of the processing loop; and obtain optimal operating knobs for an input image and a desired image quality bound received from the user by using heuristics, wherein the heuristics comprises at least one of a gradient descent, a mean squared error, and a convex optimization solving method, wherein the gradient descent-based optimization search is applied to identify an optimal configuration of the operating knobs for the input image required for the approximate quantization process and the controlling the processing loop based on the desired image quality bound.

6. The system of claim 5, wherein the heuristics comprises quality metrics to evaluate performance of the heuristics and tune the operating knobs, wherein the quality metric comprises one of a percentage Sum of Absolute Differences (% SAD), a Structural Similarity Index (SSIM), and a Peak Signal to Noise Ratio (PSNR).

7. The system of claim 5, wherein the controller unit is further configured to:

obtain the generated Q-E plots representing insights into degradation of quality of decoded images; and determine an operating knob configuration along with relative energy saving value for N images corresponding to a specific output image quality bound.

8. The system of claim 5, wherein in identify an optimal configuration of the operating knobs for the input image required for the approximate quantization process and the controlling the processing loop based on the desired image quality bound, the controller unit is configured to:

vary a plurality of loop perforation categories and bit truncation levels to obtain an optimal configuration for a particular output quality bound; and configure a degree of loop perforation and the bit truncation, respectively, by tuning in direction of steepest gradient of ratio of energy savings to quality degradation resulting from the variation in each degree of the approximation knobs.

9. The system of claim 1, wherein in processing the image blocks based on a comparison of the current image block to a previous image block, the controller unit is configured to perform one of compression, information generation, and inference.

10. The system of claim 1, wherein in identifying the power of two value for each element of the quantization matrix, the MSB locator unit is configured to:

determine a location of a first occurrence of the most significant bit (MSB) from a most significant side, wherein the MSB is determined for each Q value in Q matrix; and determine the number of bits to be shifted based on the determined location of the MSB, wherein the determined number of bits corresponds to the identified power of two for the corresponding element of the quantization matrix.

11. The system of claim 10, wherein in determining the location of the first occurrence of the MSB, the MSB locator unit is configured to:

store each Q value in the Q matrix in a n*n shift register;

shift each binary value corresponding to each Q value by one bit until first occurrence of the MSB is determined; and identify the location of the MSB determined based on number of bits shifted.

12. A method for compressing multimedia data into digital samples comprising:

receiving, by a processor, plurality of input multimedia data from an image processing system;

segmenting, by the processor, the plurality of input multimedia data into a plurality of image blocks;

performing, by the processor, a two-dimensional discrete cosine transform (2D-DCT) on each image block to generate a corresponding frequency domain representation;

controlling, by the processor, a processing loop for processing the plurality of image blocks based on a comparison of a current image block to a previous image block, wherein processing of the current image block is skipped when the current image block satisfies a predetermined similarity criteria with respect to the previous image block;

quantizing, by the processor, the frequency domain representation using an approximate quantization process and a quantization (Q) matrix, the approximate quantization process comprising:

identifying, by the processor, a power of two value equal to $2^s$ for each element of the quantization matrix, where s is a position of a most significant '1' bit of the element;

generating, by the processor, an updated Q matrix by assigning each element of the quantization matrix with the identified power of two value; and shifting, by the processor, each element of the updated Q matrix by a number of bits to generate a quantized frequency domain representation, wherein the number of bits corresponds to the identified power of two for the corresponding element of the updated Q matrix;

serializing, by the processor, the quantized frequency domain representation to generate serialized samples;

performing, by the processor, entropy coding on the serialized frequency domain representation; and generating, by the processor, compressed digitized samples for the coded frequency domain representation.

13. The method of claim 12, wherein the approximate quantization process further comprises bit truncating, by the processor, one of less significant bits and most significant bits of the frequency domain representation, wherein the bit truncation is implemented by modifying a bit width throughout a JPEG accelerator data path.

14. The method of claim 12, wherein the processing loop is controlled using one or more tunable operating knobs to control a degree of bit truncation and a degree of loop skipping based on the user's quality requirements.

15. The method of claim 12, further comprising:

generating, by the processor, a quality-energy (Q-E) plot for different degrees of approximation in the approximate quantization process and the controlling the processing loop; and obtaining, by the processor, optimal operating knobs for an input image and a desired image quality bound received from the user by using heuristics, wherein the heuristics comprises at least one of a gradient descent, a mean squared error, and a convex optimization solving method, wherein the gradient descent-based optimization search is applied to identify an optimal configuration of the operating knobs for the input image required for the approximate quantization process and the controlling the processing loop based on the desired image quality bound.

16. The method of claim 15, wherein the heuristics comprises quality metrics to evaluate performance of the heuristics and tune the operating knobs, wherein the quality metric comprises one of a percentage Sum of Absolute Differences (% SAD), a Structural Similarity Index (SSIM), and a Peak Signal to Noise Ratio (PSNR).

17. The method of claim 15, further comprising:

obtaining, by the processor, the generated Q-E plots representing insights into degradation of quality of decoded images; and determining, by the processor, an operating knob configuration along with relative energy saving value for N images corresponding to a specific output image quality bound.

18. The method of claim 15, wherein identifying an optimal configuration of the operating knobs for the input image required for the approximate quantization process and the controlling the processing loop based on the desired image quality bound comprises:

varying, by the processor, a plurality of loop perforation categories and bit truncation levels to obtain an optimal configuration for a particular output quality bound; and automatically configuring, by the processor, a degree of loop perforation and the bit truncation, respectively, by tuning in direction of steepest gradient of ratio of energy savings to quality degradation resulting from the variation in each degree of the approximation knobs.

19. The method of claim 12, wherein identifying the power of two value for each element of the quantization matrix comprises:

determining, by the processor, a location of a first occurrence of the most significant bit (MSB) from a most significant side, wherein the MSB is determined for each Q value in Q matrix; and determining, by the processor, the number of bits to be shifted based on the determined location of the MSB, wherein the determined number of bits corresponds to the identified power of two for the corresponding element of the quantization matrix.

20. The method of claim 12, wherein determining the location of the first occurrence of the MSB comprises:

storing, by the processor, each Q value in the Q matrix in a n*n shift register;

shifting, by the processor, each binary value corresponding to each Q value by one bit until first occurrence of the MSB is determined; and identifying, by the processor the location of the MSB determined based on number of bits shifted.

* * * * *